(Model.)
J. F. KOENIG.
SHOE NAIL CLINCHER.
No. 288,244. Patented Nov. 13, 1883.
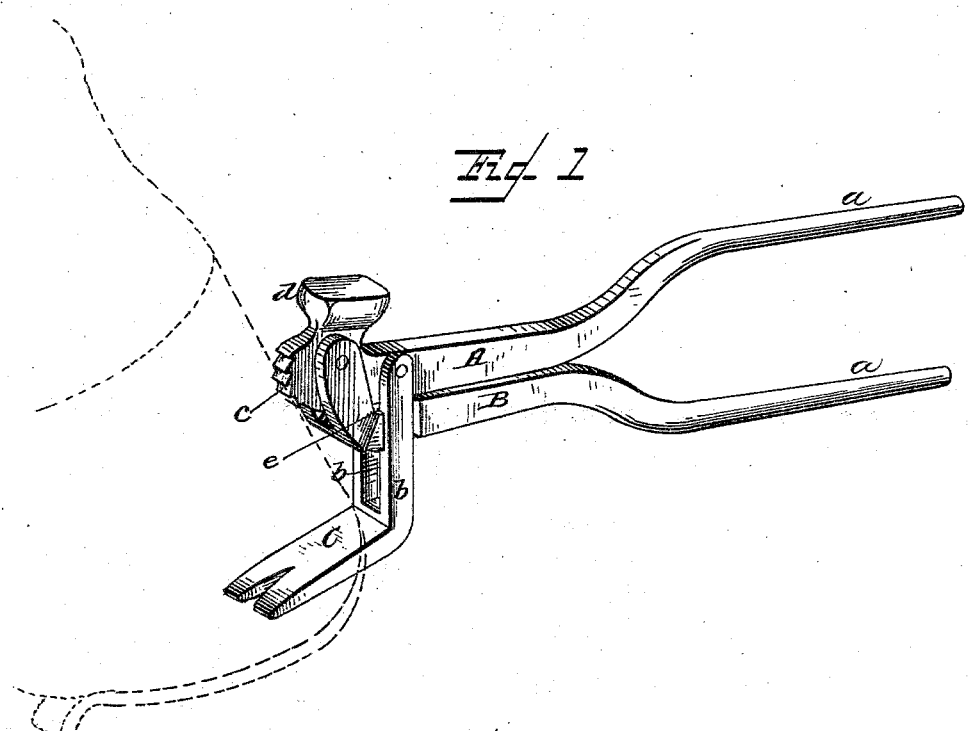
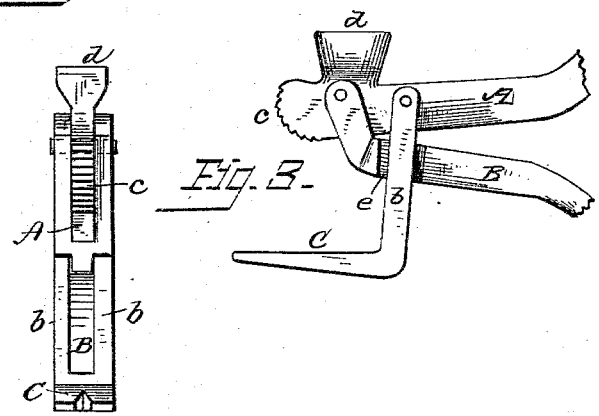
WITNESSES
F. L. Ourand
N. E. Oliphant
INVENTOR
John F. Koenig
per Chas. H. Fowler
Attorney

UNITED STATES PATENT OFFICE.

JOHN F. KOENIG, OF SCHLUERSBURG, MISSOURI.

SHOE-NAIL CLINCHER.

SPECIFICATION forming part of Letters Patent No. 288,244, dated November 13, 1883.

Application filed September 25, 1883. (Model.)

*To all whom it may concern:*

Be it known that I, JOHN F. KOENIG, a citizen of the United States, residing at Schluersburg, in the county of St. Charles and State of Missouri, have invented certain new and useful Improvements in Shoe-Nail Clinchers; and I do hereby declare that the following is a full, clear, and exact description of the same, reference being had to the annexed drawings, making a part of this specification, and to the letters and figures of reference marked thereon.

Figure 1 of the drawings is a perspective view of my invention; Fig. 2, a front elevation of the same; Fig. 3, a side view with a portion of the handles broken away.

This invention relates to certain new and useful improvements in shoe-nail clinchers for the use of horseshoers, and has for its object to provide such a device as will be simple and inexpensive in its construction, and effective in its operation, whereby the work incidental to shoeing horses will be greatly facilitated and more neatly finished, these objects being attained by the construction substantially as shown in the accompanying drawings, and hereinafter more fully described.

In the drawings, A represents an upper, and B a lower, handle or lever, each being provided with a suitable hand-grip, $a$. The upper handle or lever, A, is pivoted between bifurcations $b$ of a bearing-plate, C, having its lower or horizontal portion adapted for use as a claw, said handle or lever having its front end provided with ratchet-teeth, as shown at $c$, and is also formed with a hammer, $d$. The lower handle or lever, B, is pivotally connected to the hammer end of the one A, and has cut in its sides grooves $e$, in which rest the bifurcations of the bearing-plate C, forming guides for said handle or lever when the device is operated, thus always retaining the same in its proper position to prevent any slipping or disarrangement. The grooves $e$, as will be noticed, are somewhat wider than the bifurcations $b$, so that a sufficient space at each side thereof is provided to allow the proper vibration of the bifurcations in the operation of the device.

In the operation of my invention, when it is desired to clinch the nails, after having secured the shoe to a horse's hoof, the bearing-plate C is placed under the shoe and the two handles or levers held tightly together, so as to bring the ratchet-teeth at the front end of the handle or lever A against the nail to be clinched. After this adjustment has been effected the handle or lever A is drawn in an upward direction, thereby causing the end of the nail to be clinched down upon the horse's hoof, the entire operation being very quickly performed, owing to the amount of leverage obtained. While the lever or handle A is being drawn up, the handle or lever B is pressed down in an opposite direction to more effectually clinch the nail, said handle or lever serving to hold the bearing-plate C in a horizontal position by means of its grooves $e$, acting as guides for the bifurcations $b$ of said bearing-plate.

The hammer $d$ is intended for striking the clinch, as it is sometimes found necessary to do in order to give a good finish, and the claw formed in the horizontal portion of the bearing-plate is for drawing nails that may have gone crooked, or when from other causes their withdrawal is found desirable, the entire device forming a very useful tool.

Having now fully described my invention, what I claim as new, and desire to secure by Letters Patent, is—

1. A shoe-nail clincher consisting of upper and lower handles or levers, each formed with suitable hand-grips, the former having its front end terminating in ratchet-teeth, the latter constructed with grooves in its sides and pivotally connected to the former, and a bifurcated bearing-plate, to which is pivoted the upper handle or lever, substantially as and for the purpose set forth.

2. The combination, with an upper handle or lever having its front end terminating in ratchet-teeth and formed with a hammer, of a lower handle or lever pivotally secured thereto, and constructed with grooves in its sides and a bifurcated bearing-plate having its horizontal portion provided with a claw, substantially as and for the purpose specified.

In testimony that I claim the above I have hereunto subscribed my name in the presence of two witnesses.

JOHN F. KOENIG.

Witnesses:
GUSTAV TELGEMEIER,
LOUIS GRONEMEN.